(12) United States Patent
Hutchinson-Kay et al.

(10) Patent No.: US 8,516,124 B2
(45) Date of Patent: Aug. 20, 2013

(54) GAME SESSION MANAGEMENT FOR JOINING MULTIPLE GAME MACHINES IN A SINGLE GAME SESSION

(75) Inventors: Christer Hutchinson-Kay, Taby (SE); Henrik Kniberg, Ska (SE); Jens Gustav Nilsson, Saltsjo-Boo (SE); Peter Vincent, Hagersten (SE); Sven Hakan Andersson, Sundbyberg (SE); Thomas Rizos, Johanneshov (SE); Ulf Abrink, Balsta (SE)

(73) Assignee: ACEI AB (SE)

( * ) Notice: Subject to any disclaimer, the term of this patent is extended or adjusted under 35 U.S.C. 154(b) by 720 days.

(21) Appl. No.: 12/177,676

(22) Filed: Jul. 22, 2008

(65) Prior Publication Data

US 2009/0131174 A1    May 21, 2009

Related U.S. Application Data

(63) Continuation of application No. PCT/SE2006/000098, filed on Jan. 24, 2006.

(51) Int. Cl.
*G06F 15/16* (2006.01)
*G06F 17/00* (2006.01)
*G06F 19/00* (2011.01)

(52) U.S. Cl.
USPC ............................................. 709/227; 463/42

(58) Field of Classification Search
USPC ........................................... 709/227; 463/42
See application file for complete search history.

(56) References Cited

U.S. PATENT DOCUMENTS

| | | | |
|---|---|---|---|
| 5,663,717 A * | 9/1997 | DeLuca | 340/323 R |
| 6,807,562 B1 | 10/2004 | Pennock et al. | |
| 6,811,486 B1 | 11/2004 | Luciano, Jr. | |
| 6,874,029 B2 * | 3/2005 | Hutcheson et al. | 709/227 |
| 7,464,272 B2 * | 12/2008 | Danieli | 713/182 |
| 7,500,913 B2 * | 3/2009 | Baerlocher | 463/16 |
| 7,584,154 B1 * | 9/2009 | Chen et al. | 705/80 |
| 2002/0035685 A1 * | 3/2002 | Ono et al. | 713/155 |
| 2004/0002384 A1 * | 1/2004 | Multerer et al. | 463/42 |
| 2004/0142742 A1 | 7/2004 | Schneider et al. | |
| 2004/0219967 A1 | 11/2004 | Giobbi et al. | |
| 2005/0192098 A1 * | 9/2005 | Guo et al. | 463/42 |
| 2006/0178216 A1 * | 8/2006 | Shea et al. | 463/42 |

FOREIGN PATENT DOCUMENTS

WO    2007086779    8/2007

OTHER PUBLICATIONS

International Search Report No. PCT/SE2006/000098 dated Aug. 22, 2006.

* cited by examiner

*Primary Examiner* — Jeong S Park
(74) *Attorney, Agent, or Firm* — McAndrews, Held & Malloy, Ltd.

(57) ABSTRACT

A computerized gaming system operates a plurality of gaming machine terminals coupled to a gaming server. A game session is initiated by a player for one gaming machine terminal. The game player thereafter identifies a second gaming machine terminal to be coupled to the same game session.

26 Claims, 6 Drawing Sheets

GAME SESSION MANAGEMENT FOR JOINING MULTIPLE GAME MACHINES IN A SINGLE GAME SESSION

RELATED APPLICATIONS

This application claims priority to, and is a continuation of International Application No. PCT/SE2006/000098 having an International filing date of Jan. 24, 2006, which is incorporated herein by reference in its entirety.

FEDERALLY SPONSORED RESEARCH OR DEVELOPMENT

[Not Applicable]

MICROFICHE/COPYRIGHT REFERENCE

[Not Applicable]

TECHNICAL FIELD

The present invention relates in general to the management of game sessions of a computerized game of chance operated via gaming machine terminals in a computerized gaming system, and more particularly to the management of a game session related to a plurality of gaming machine terminals.

BACKGROUND

Gaming is continuously developing in terms of game contents and winning schemes, for example in order to meet the shifting demands of players with regard to entertainment and gaming excitement. With more interesting game content and winning schemes games tend to have a longer duration and in some gaming applications prizes of considerable magnitude at stake. For these and other reasons there is an increased demand from players for the possibility to interrupt or make a pause in an ongoing game and to resume the game at some other point, in time at some other location or from a different gaming machine. Some games are not appropriate or favourable to interrupt and yet a player may wish to change location or gaming machine terminal. In such cases there is a need for moving the player operation of the game from one gaming terminal to another without interrupting the active game session.

PRIOR ART

Examples of prior art is found in the following patent publications.

US 20040219967 A1 shows a method to pause a game played via a first gaming machine and resuming the game in the same gaming machine or via another, second gaming machine. The status of a paused game is stored at a central database linked to the gaming machines and is associated with a personal identifier of the player. To continue a paused game, the game play is continued by retrieving the game status from the central database in response to the input of the associated personal identifier via the same or another gaming machine.

U.S. Pat. No. 6,811,486 B1 shows a system and method for maintaining a player's enhanced game play state in a gaming environment. In particular, the player may restore enhanced game play states from previously played games either from the same game device or from another game device, the enhanced game play states typically being enhancements to casino games.

U.S. Pat. No. 6,165,071 shows a method and apparatus which allows player gaming to transpire over a series of sessions without a player losing credit for performances in earlier sessions. A player card carries thereon the current status of the player's performance during the course of previous sessions and it updated during subsequent sessions. Milestones are recognized as opportunities for providing the player with awards as these milestones are achieved.

In these pieces of prior art the game is thus paused or terminated by saving a game status and interrupting the game session execution The paused or terminated game is then continued by starting a new game session execution, retrieving the saved game status and executing the game dependent on the retrieved game status.

OBJECT OF THE INVENTION

It is an object of the present invention to provide a system for management of a game session related to a plurality of gaming machine terminals, in particular wherein a plurality of gaming machine terminals are related to a common game session of a computerized game of chance operated in a computer based gaming system with computerized gaming machine terminals that are connected to a remote central gaming server and a remote data storage.

Aspects of the objects and related problems are:

To enable presentation of output from the game executed in a game session to a multiple of gaming machine terminals.

To enable player input from a multiple of gaming machine terminals to the game executed in a game session.

To transfer the operation of an on-going game session from one gaming machine terminal to another without interrupting the game session.

To enable presentation of output, to enable player input and to enable transfer the operation of an on-going game session from one gaming machine terminal of a first technical platform type to another gaming machine of a second technical platform type.

SUMMARY OF THE INVENTION

In accordance with the invention the object is achieved by enabling the coupling of a plurality of gaming machine terminals to a common game session of a single player session.

The invention is typically employed such that after a player has initiated a game session for a first gaming machine terminal in communication with the gaming server and thereby has coupled this first gaming machine terminal to the game session, the player initiates the coupling of another second gaming machine terminal to the same game session. The player, or the server system, identifies a specific or addressable second gaming machine terminal to be coupled to the current game session. Thereafter, the coupling of the second gaming machine terminal to said game session is established.

Preferably, the invention also comprises checking the capability of said second gaming machine to execute the game of said game session. This would include communicating game session execution information to said second gaming machine terminal. If needed the second gaming machine terminal is then configured dependent on said game session execution information.

An advantageous aspect of the invention is the concept of establishing a terminal session coupled to the game session for each gaming machine terminal that is to be coupled to this game session. Typically, a second terminal session for an identified game session is established for a second gaming machine terminal in response to a request for coupling a second gaming machine terminal to said game session.

Aspects of the invention are directed to identifying the additional game session terminal to be coupled to the current game session, to manage establishment and time delay in coupling the gaming terminals and to manage input and output from coupled gaming machine terminals.

Other aspects and advantages of the invention are described in the description below. The invention is preferably realised as a method, a system and a computer program product.

BRIEF DESCRIPTION OF ACCOMPANYING DRAWINGS

The inventive concept is further explained by means of examples and in conjunction with the accompanying drawings, in which.

DETAILED DESCRIPTION OF EMBODIMENTS OF THE INVENTION

The Figures illustrate the configuration of a gaming system as well as a method for managing a game session, a method for managing a game session and a computer program product in accordance with the invention.

General Setting

Figure 1:
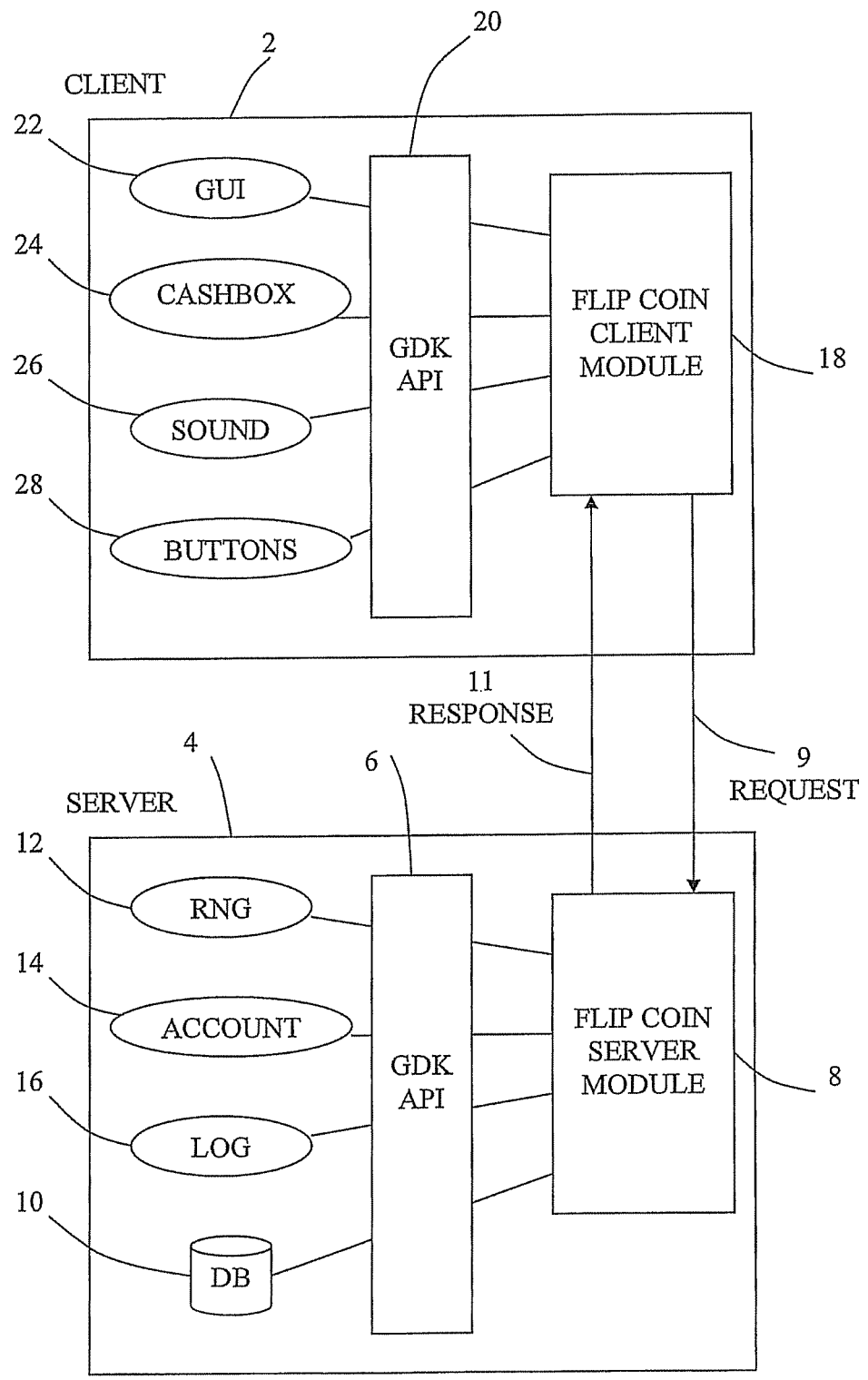
FIG. 1 shows a schematic outline of a client-server based gaming system according to an embodiment of the invention.

FIG. 1 shows schematically a client and server based computerised gaming system with a gaming machine 2, herein also called a video lottery terminal, set up as a client gaming machine 2 and a gaming server 4 that are communicatively coupled. The gaming machine 2 and the gaming server 4 are provided with data processors, memory means, data communications interfaces, control programs, user input/output interfaces etc. in a per se well known manner. Different functions and features that are specific for the present invention are preferably realised by means of software computer program code executed on the server and the client respectively, by means of specifically designed electronic components or by means of combinations of software and electronic components. In the example of FIG. 1 there is only a single client gaming machine but of course a number of client gaming machines can be and is normally connected to a server as shown in FIG. 3A.

The server 4 is provided with a game application program interface (server game API) 6 enabling communication between a server module 8 of a specific game application program and general server gaming functions 10,12,14,16 installed on the server. The general server gaming functions are provided to be available for any specific game application program independently of the specific game content. These general server gaming functions are typically critical functions such as a database 10, a random number generator 12, an account service function 14, a log service function 16, or other functions that beneficially are shared and used by different specific game application programs.

The client gaming machine 2 is also provided with a game application program interface (client game API) 20 enabling communication between a client game module 18 of the specific game application program and general client gaming functions 22,24,26,28 installed on the client gaming machine 2 and used by different client game modules. The general client gaming functions are designed for assisting in implementing and executing a specific game on the client gaming machine 2 and are available for the client game module 18. These general client gaming functions are in different embodiments a selection of a graphical user interface GUI 22, a cashbox function 24, a sound function 26, user input interface function, for example buttons, 28, data storage 29, a printer 3, a bar code reader 33 and other functions that are related to the performance of a game. The client game module 18 is communicatively coupled to the corresponding server game module 8 for communicating requests 9 and responses 11 in order to utilize the general gaming functions provided in the server. For each game a message protocol for communication between the client module and the server module is generated, the protocol is for example based on XML and is shared by the client and the server.

Figure 3:
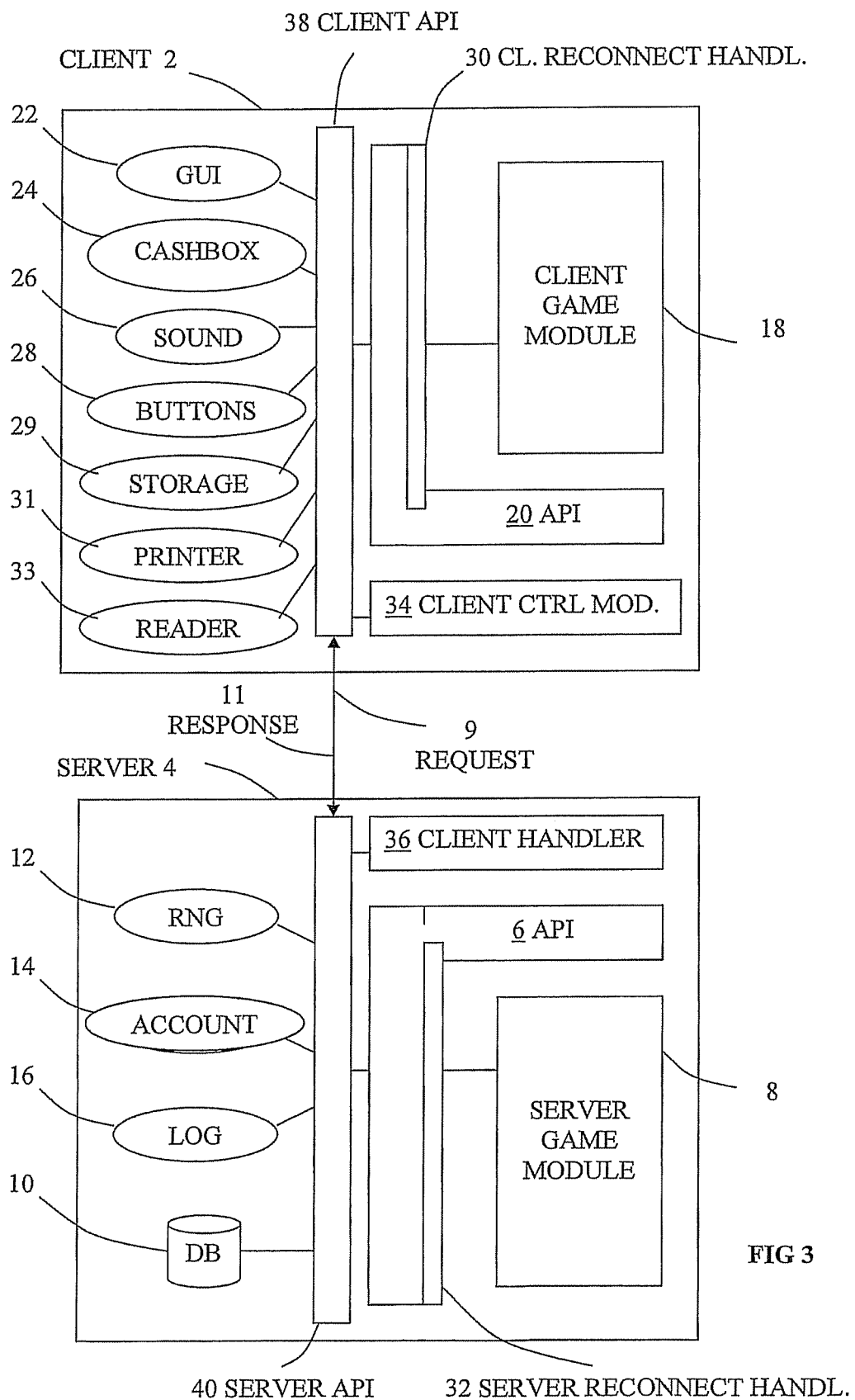
FIG. 3 shows a variety of the gaming system in accordance with the invention.
Figure 3A:
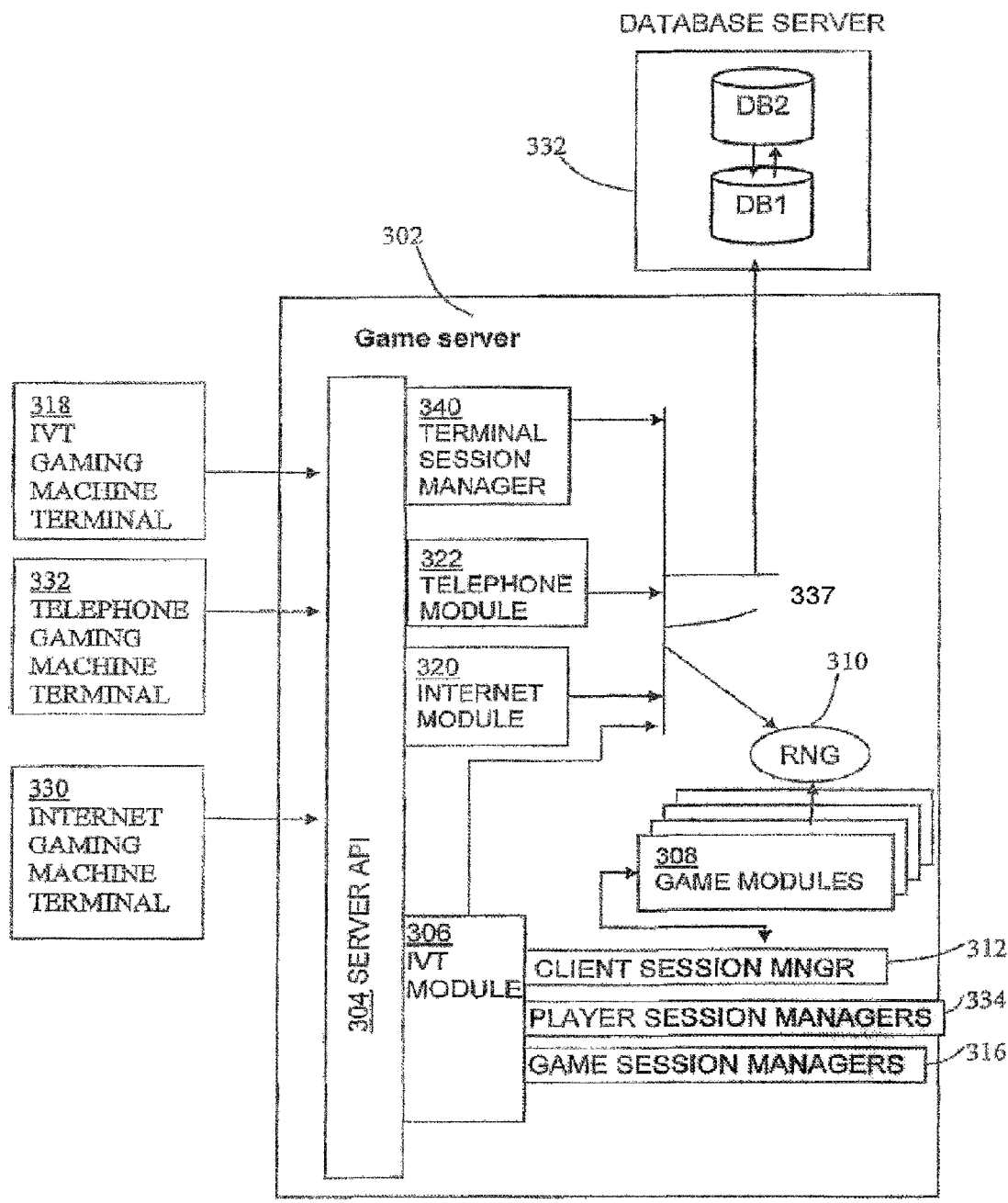
FIG. 3A shows an overview of a gaming system with different types of gaming machine terminals in accordance with the invention.

A specific game application program in accordance with the invention thus comprises a server game module 8 and a client game module 18 that communicate either directly or via an application program interface on the client side and the server side respectively as shown in FIG. 1 and FIG. 3. The client game module 18 uses a selection of general client gaming functions that are available in the client gaming machine, whereas the server module 8 uses a selection of general server gaming functions 10,12,14,16 that are commonly used by different game applications and that are provided and available centrally in the server 4.

FIG. 3 shows a more detailed view of the configuration of a client and a server in a gaming system in accordance with an embodiment of the invention and similar to that of FIG. 1. In the gaming server 4 the server game module 8 is embedded behind an application program interface called server game API 6 through which all communication of the server game module 8 takes place. The gaming server 4 further comprises a server application program interface in short called server API 40 through which all communication with the general server gaming functions 10,12,14,16 from the part of the server game API 6 as well as from the part of other server functions and external communication takes place. The server 4 is further provided with a reconnect handler 32 that in a preferred embodiment is integrated with the server game API 6. The gaming server 4 is provided with further server function modules, in the exemplifying embodiment more specifically comprising a client handler 36 that is communicatively coupled to the server API 40. The client handler 36 manages, i.e. inter alia comprising handling and serving, communications and functions of the client 2 other than the specific game applications. As illustrated in the drawing with a double arrow, communications with the client gaming machine 2 takes place via the server API 40 and a similar client API 38 provided in the client gaming machine 2. In the same manner as described above, the communication with the general client gaming functions is carried out via the client API 38. The client gaming machine 2 comprises a client control module 34 that controls communications and general functions of the client gaming machine other than the specific game applications and communicates via the client API 38. In the gaming client 2 the client game module 18 is, similar to the configuration of the server, embedded behind an application program interface called client game API 20 through which all communication of the client game module 18 takes place. The client 2 is further provided with a reconnect handler 30 that in a preferred embodiment is integrated with the client game API 6.

Figure 2:
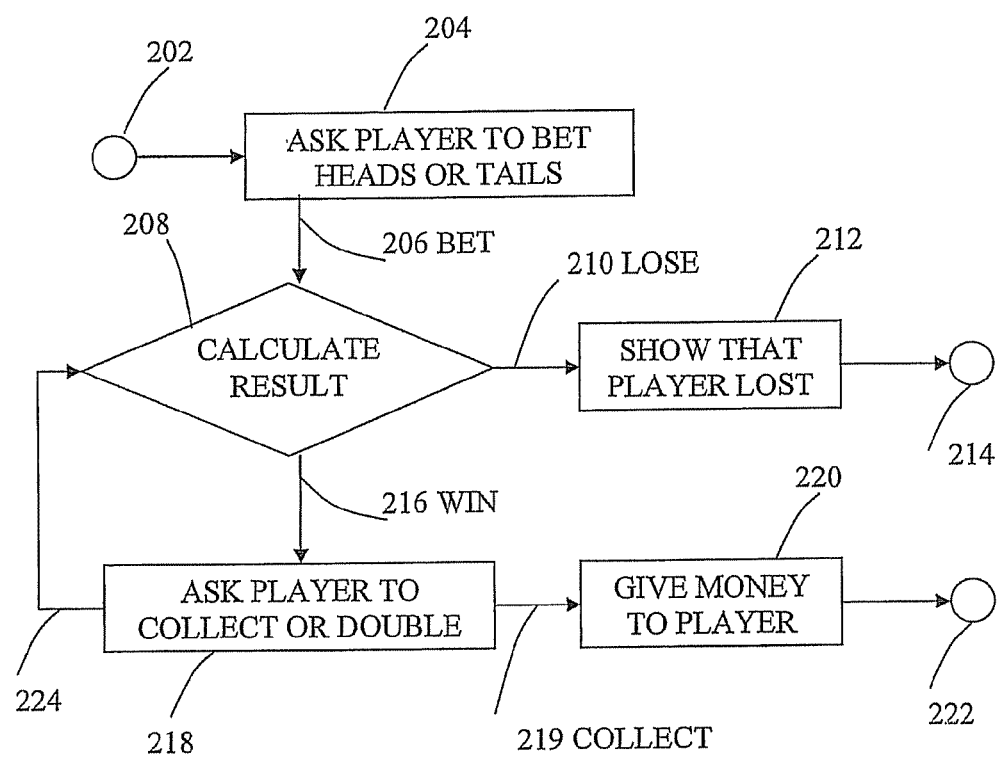
FIG. 2 shows a flow chart of a simple example of a gaming application.

FIG. 2 shows schematically a simple example of a portion of a gaming application in accordance with the invention, more particularly a flip coin game of chance. The game is run by executing the client game module 18 and the general client gaming functions of the flip coin gaming application in a client gaming machine in step 202. In step 204 the player is presented a message asking the player to bet on heads or tails. The player places a bet 206 and a result is calculated in 208. Step 208 involves the client game module 18 sending a request to the server game module 8 to generate an outcome of the game. The server game module in its turn calls the random number generator 12 and receives a random number in return. The server game module calculates an outcome according to predetermined rules for the game and dependent on the returned random number. Thereafter, a response with the outcome Win or Lose is communicated back to the client game module. If the outcome is Lose 210 the player is presented a message showing that player lost 212, and the game is ended in 214. If, on the other hand the outcome is Win 216 the player is presented a message asking player to collect the prize or double a bet again 218. If the player inputs a request to Double 224, a new result is calculated in 208 in the above manner. If on the other hand the player inputs a request to Collect 219, the prize, usually in the form of cash or credit money, is paid to the player and the game ends in 222. The payout of a prize again preferably involves requesting services from the server game module and for example utilizing the general server gaming functions account function 16 and database function 10.

FIG. 3A shows an exemplifying embodiment of a gaming system adapted to handle different types of gaming machine terminals. The gaming server 302 is as shown above provided with a server API 304 preferably comprising a message dispatcher for communicating messages between different entities of the gaming system. A number of different modules adapted to operate gaming applications via gaming machine terminals of different type or implemented on different technical platforms are provided and coupled to the server API 304.

So for example, an interactive video terminal (IVT) server module 306 is provided to operate game applications played via an interactive video terminal (IVT) gaming machine 318 that e.g. is based on the technical platform of a general personal computer and setup to communicate with the gaming server via a data communications network. The IVT server module 306 comprises game modules 308 that receive random numbers from a random number generator (RNG) 310 provided in or coupled to the gaming server 302. The IVT server module 306 further comprises a client session manager 312 configured to manage the client-server relationship in a client session setup with a client gaming machine terminal. Furthermore, the IVT server module 306 comprises a player session manager 334 configured to manage specific player sessions and a game session manager 316 configured to manage game sessions executed by a player.

An internet terminal module 320 is also provided in the gaming server 302 and configured for the purpose to operate game applications played via a client game application program that emulates an Internet gaming machine terminal 330 communicating with the gaming server 302 via the Internet. Such a client game application program is typically executed on a personal computer or similar device. Similarly, a telephone terminal module 322 is provided in the gaming server 302 and configured for the purpose to operate game applications played via a client game application program that emulates a telephone gaming machine terminal 330 that communicates with the gaming server via a wired or a wireless telephone network. The currently most feasible telephone application is a mobile phone communicating via a mobile telephone network. The server gaming machine terminal modules 306, 320 and 322 communicates via a data bus line 337 with general server functions such as a random number generator 310 and a database 332. In different implementations of the invention, corresponding terminal modules for other types of devices are provided in a similar manner, for example for digital television or radio frequency based communication devices.

There are different embodiments with different configurations of server side functions. In one variety, each technical platform module has its own set of server game modules, client session manager, player session manager and game session manager as schematically shown in FIG. 3A for the IVT module 306 and where these functional units are comprised in but not shown in the Internet terminal module 320 and the telephone terminal module 322. In another variety, the technical platform modules are interfaced with shared common game modules, player session manager and game session manager.

A terminal session manager 340 is provided in the server, preferably comprised in the server game API 6 or possibly configured as a functional module coupled to the server API 6. The terminal session manager operates as explained below.

Figure 4:
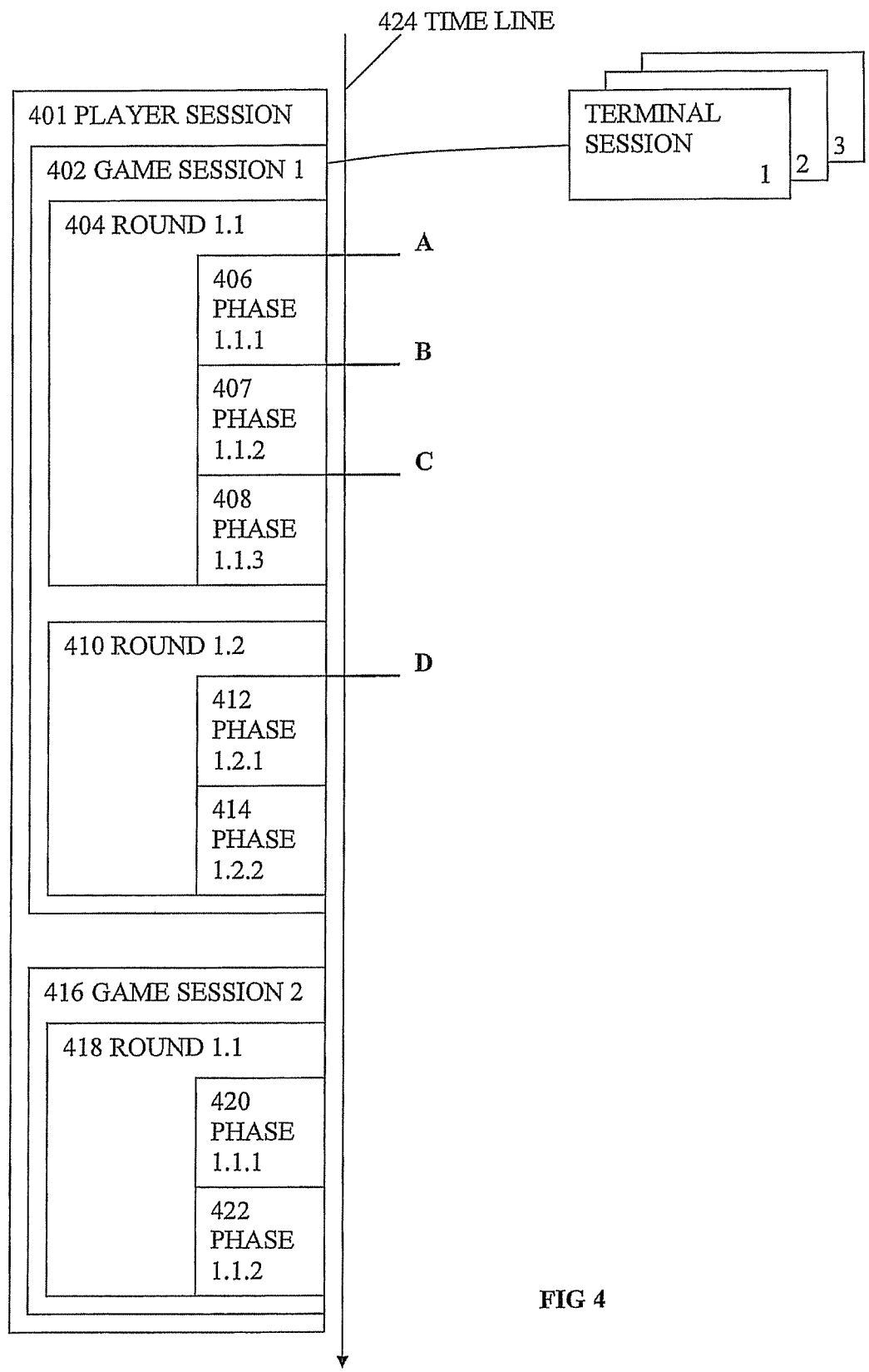
FIG. 4 shows a schematic view of different phases of a game.

FIG. 4 illustrates schematically an example of the lifecycle of a game in drawn in relation to a timeline 424. A player session 401 is initiated by a player by inputting start commands via a user interface of the gaming machine. The player initiates a game and inputs a bet in terms of a monetary value by means of some kind of payment method such as coins or an account transaction and thereby starts a first game session 402. The game session progresses in discrete steps herein called game rounds and exemplified with a first round 404 and a second round 410. Each round in turn progresses in discrete steps called game phases. So for example, round 404 comprises three game phases 406,407 and 408. The transition between game phases is driven by game round events which in different embodiments may have different content and different triggering mechanisms.

A game round event is triggered by an input that starts the generation of a set of associated elements of critical game session data that defines a game result preferably comprising the current bet value, a current generated random number and a current win value. The game round event would usually be triggered by a player making an input through an I/O interface such as a push button that conveys game commands like "Deal cards!" in a poker game.

In a simple example the game session data that defines a game result is generated in a gaming machine. The game round event is triggered whereupon the generation of this set of game session data is executed and the data set is completed. A confirmation of successful storage is generated, a presentation of the game result is output to the player and the game phase is ended. In the client-server architecture described above, the client game module contacts the server game module with a request in response to the triggering of a game round event. The server game module executes the request and creates game result defining game session data for the current game phase. This data is stored in the server database and a response comprising the game result defining data is transmitted to the client whereupon a presentation of the game result is output to the player and the game phase is ended. The presentation of the game result to the player typically comprises updating a screen display of the gaming machine.

At the beginning of each game phase, in FIG. 4 illustrated with time indicators A, B, C, D, the gaming machine, e.g. the client game module, is set in a waiting mode waiting for input from the player. When a game round event is triggered by the player, the client game module and the server game module executes the game rules, moves the game process to the beginning of the next phase, stops and again goes into the waiting mode to wait for player input. From a gaming system macro perspective the execution of a game progresses in discrete steps where the game phases are the smallest units of execution. An interruption is defined as the event that the gaming machine looses contact with the remote data storage, or as the case may be in a client-server gaming system with the server, for a predetermined amount of time during a game session. The interruption can occur at any point in time and may be intentional or unintentional as a result of a player action, a system operation action or due to gaming machine failure, data communications failure or other system failure.

Embodiment of Game Session Management

The invention is thus applied in a computerized gaming system adapted for operating a plurality of client gaming machine terminals communicatively coupled to a gaming server. In a typical situation a number of gaming machine terminals are operatively coupled to and communicates with the gaming server, new gaming machine terminals of different technical platforms log onto and log off from the server as player sessions and game sessions are started and terminated from each respective gaming machine terminal. The present invention is devised to enable a plurality of gaming machine terminals to be coupled to a common game session by means of terminal sessions defined for the game session.

In a typical case in which the invention is employed a player has started the initiation of a player session for a first gaming machine terminal, for example an interactive video terminal gaming machine at a casino venue. The player continues by starting the initiation of a game session via this a first gaming machine terminal in communication with the gaming server and the game session is given an identification code. Game session data including game session identity information is stored in the server database together with gaming machine identity, thereby coupling said first gaming machine terminal to said game session. The step of initiating a game session for a gaming machine would normally comprise the player entering a player command via the input/output interface of the client gaming machine terminal for example by selecting a specific game presented on a game selection menu on the display screen. The selected client game module and corresponding server game module is started involving communication via the client API and the server API. A first terminal session associated with and coupled to the initiated game session is established and is defined by means of terminal session data. The terminal session data comprises parameters for communication with and performing game execution by means of each respective gaming machine terminal and/or terminal session identity information. Then the coupling of a second gaming machine terminal to the game session is initiated. This may as in one embodiment be done by means of a player command entered via the first gaming machine terminal or as in another embodiment be initiated from the server or even from another gaming machine terminal. A specific second gaming machine terminal to be coupled to said game session is identified and the coupling of this specific second gaming machine terminal to said game session is established.

In one embodiment the game session identity information is output to the player via the first gaming machine terminal running the first terminal session. Preferably, the game session identity information that is used for the purpose of the coupling of multiple terminals to a game session is different from the game session identity used for internal purposes in the server. The player receives the game session identity information via the display, via a paper slip or by some other means or carrier. The player then inputs the received game session identity information via a second gaming machine terminal and requests for example via a command entry that this second gaming machine be coupled to the thus identified game session. In response to the request a terminal session manager in the server establishes a second terminal session for the identified game session and the second gaming machine terminal, and thereby establishes coupling of the second gaming machine terminal to the current game session.

In another embodiment the server connects to a predetermined gaming machine terminal selected by the player. In one variety, selectable predetermined gaming machine terminals are presented to the player running the first terminal session on the first gaming machine terminal. The player selects a second gaming machine terminal and thereby inputs a request command for coupling to that second gaming machine terminal. In another variety conveniently employed in a gaming system using player cards or some other means for identifying a specific player, selectable gaming machine terminals are predefined and stored associated to the specific player identity. These player specific gaming machine terminals are for example a specific mobile telephone number or a specifically addressed device or application program that is connectable to the gaming server via the Internet or other communications network.

Yet another embodiment is devised such that identity information for a second gaming machine terminal is entered via the first gaming machine terminal and communicated to the terminal session manager of the gaming server. An input interface is provided for this purpose and the thus input identity information for a gaming machine terminal may for example relate to another interactive video terminal type gaming machine terminal at a gaming venue, to a mobile or wired telephone number or to a gaming machine terminal that is associated with or is running connected to a specific player identification. In response to the input of the identity information, the server contacts the thus identified second gaming machine terminal and establishes a second terminal session for this gaming machine terminal coupled to the game session.

In one embodiment of the invention, the system is devised to enable a certain time delay in establishing coupling of the second gaming machine terminal. For example, in the case that the player requests coupling to a second gaming machine terminal associated to a specified player card or player identity, the player card may not be activated with a gaming machine terminal at the moment. In this case the terminal session manager establishes a second terminal session for the game session and goes into a monitoring mode waiting for an indication that the specified player card or player identity has been logged onto the server after being entered into a second gaming machine terminal. When the specified player card or player identity has been logged on to the server from a second gaming machine terminal this is detected by the terminal session manager whereupon the second terminal session and the game session is coupled to the second gaming machine terminal. For the case that an addressable gaming machine terminal is specified as the second gaming machine terminal, the terminal session manager repeatedly tries to establish contact with the second gaming machine terminal for example by calling a mobile telephone number or by trying to get into communicative contact with an application program coupled to an internet user account. The accepted delay in establishing contact with the second gaming machine terminal is predetermined by means of an adjustable and pre-settable delay parameter of the terminal session manager, and may be different for different types or cases of second gaming machine terminal coupling. After the predetermined delay time has passed without a second coupling having been established the second terminal session is terminated.

A variety of this embodiment is devised such that the first terminal session may be terminated while the second terminal session continues to exist however with a delay in the coupling to a specific second gaming machine terminal. In a use case example employing player cards, a player executing a first terminal session at a first gaming machine terminal may wish to change gaming machine terminal and continue playing at a second gaming machine terminal without terminating or interrupting the game session for example because of earned bonus in the current game. The player requests a second terminal session for a second gaming terminal coupled to his own player account identified with his player card. A second terminal session is established but the coupling to a second gaming machine terminal is delayed because the player card is already occupied by the first terminal session run on the first gaming machine terminal. Now, the player terminates the first terminal session, takes his player card from the first gaming machine terminal, and enters the player card into a second gaming machine terminal. The second gaming machine terminal logs on to the server, the terminal session manager detects or is notified about this fact and couples the second terminal session to the second gaming machine terminal whereupon the game session can proceed operated from the second gaming machine terminal. The effect of this is that the player operation of the game is roamed between gaming machine terminals. If the predetermined allowed time delay is exceeded the second terminal session is terminated and if it is the last and only active terminal session also the game session is terminated and is handled as an interrupted game session as described elsewhere in this text. Typically any bonus would be lost but any current stake be preserved as a credit of the player.

In order to ensure that the second gaming machine terminal is fit to be coupled to the game session, the capability of the second gaming machine terminal to execute the current game is checked and its feasibility validated. This step would preferably comprise retrieving information about the game session and generating data about requirements on the second gaming machine terminal, for example capability to execute a certain client game module. This information and data is herein called game session execution data. Dependent on the manner of making contact between the gaming server and the second gaming machine terminal, this step would also comprise some communication between the terminal and the server to find out whether the terminal is capable of communicative contact, has access to such a client game module in an acceptable version and fulfil other possible requirements. The response is verified and if it is negative the player is informed.

Then game session execution information is communicated to the second gaming machine terminal and it is configured dependent on this game session specific information to prepare the terminal for the current game session, for example starting the correct client game module. The second gaming terminal is assigned the new terminal session and coupling of said second gaming machine terminal to said game session is established. Thereafter, the latest generated result of the game execution is communicated to the second gaming machine terminal, processed as in the first gaming machine terminal and game execution output is presented to the player on the second gaming machine terminal. The game session now has a first and a second terminal sessions coupled to a first and a second gaming machine terminals, and awaits next player input from one of these coupled gaming machine terminals. When the player inputs a game related input on one of the coupled gaming machine terminals, the input is treated according to the game rules as usual and a game result is generated and distributed to all the coupled gaming machine terminals, which in their turn generates the same output dependent on the game result. In one embodiment, the player input on one of the coupled terminals is distributed to the other coupled terminals for the purpose of visualizing this input on all the terminals.

Figure 5:
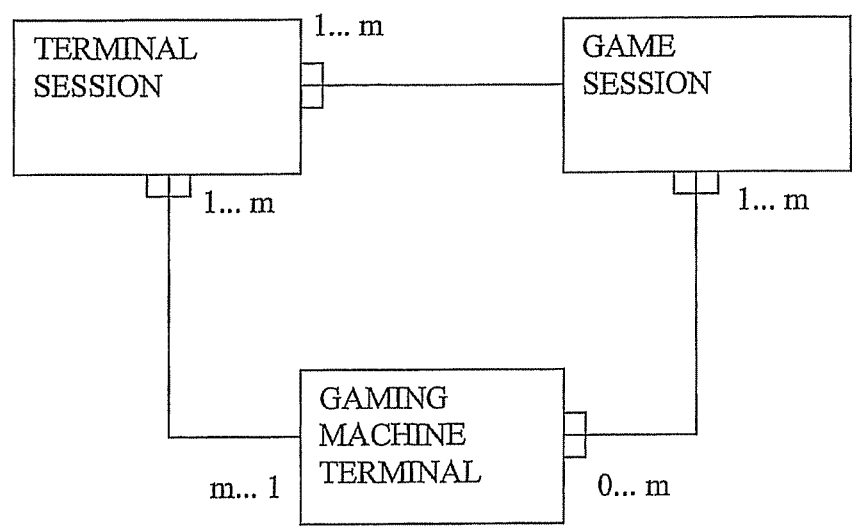
FIG. 5 shows schematically the relation between game sessions, terminal sessions and gaming machine terminals according to an embodiment of the invention.

A plurality of terminal sessions can thus be coupled to one and the same game session whereas each terminal session can only be coupled to a single game session. Thereby each game session can be coupled to a single or to a plurality of gaming machine terminals. Each gaining machine terminal can have one or a plurality of game sessions. Each gaming machine terminal can have one or a plurality of active terminal sessions. A gaming machine terminal can thus be enabled to simultaneously execute a plurality of terminal sessions coupled to a single game session or to different game sessions. In the latter case different terminal session may relate to different games or to different instances of the same game. FIG. 5 illustrates the relationship between game sessions, terminal sessions and gaming machine terminals.

The invention allows for a pre-settable number of terminal sessions and gaming machine terminals to be coupled to the same game session. Each terminal session is associated with terminal session identity information. At any time defined by predetermined rules a new terminal can be added and coupled to the game session. Similarly, when a plurality of gaming machine terminals are coupled to the same game session via terminal sessions, any of the gaming machine terminals can be inactivated for the game session and its terminal session terminated. The game session remains active until the last terminal session has been terminated. In other words, a game session is active as long as there is at least one active terminal session coupled to the game session. The delay function of the invention allows a terminal session and a game session to exist without any gaming machine terminal coupled to it, preferably for a predetermined amount of time or dependent on some other suitable control parameter.

The first and second gaming machine terminals can be terminals realised on different technical platforms, and thus a technical effect of the invention is to enable roaming of an on-going game operation between different types of terminals. That is, the game sessions remains active in the server but the player operation of the game is moved between terminals. For example, a player who plays a game on a mobile telephone client gaming machine terminal may want to shift over his operation of the game to a personal computer and continue to operate the game via a client gaming machine emulated by an application program without terminating or interrupting the game. The player then requests the coupling of a appropriately identified second gaming machine terminal to the game session, a second terminal session is activated and coupling of the second gaming machine terminal is established. The player can then inactivate the mobile telephone gaming machine terminal and continue playing via the personal computer.

Different schemes can be devised for controlling input and output from the respective coupled gaming machine terminals according to predetermined or selectable rules. For example:

1. Player input and result output only from the first gaming machine terminal or a gaming machine terminal defined as the main gaming machine terminal.
2. Only result output on a second gaming machine terminal defined as a subsidiary gaming machine terminal. A typical use situation would for example be to run the game operation in a demonstration mode, i.e. with the game played from one gaming machine terminal and the output presented on one or more second gaming machines.
3. Player input and result output from second gaming machine terminal defined as a parallel gaming machine terminal.
4. Player input and result output only from a gaming machine terminal selected by the player. In order to handle gaming machine terminal failure one of a plurality of coupled gaming machine terminals is given the function of a backup terminal. In different varieties and situations which gaming machine terminal to be the backup terminal is selected by the player or by the terminal session manager of the server system according to predetermined or pre-settable rules. If the last coupled gaming machine terminal breaks down or is disconnected, the failure is preferably handled by means of the described interruption and reconnect management system.

When a plurality of gaming machine terminals are coupled to a common game session, input and output are ordered according to a predetermined scheme preferably such that a player friendly behaviour of the system is devised. In one variety the inputs from different gaming machine terminals that are coupled to the same game session are buffered in a queue and treated in the order that the request message resulting from player input are received in the server. The game result is then communicated to the coupled gaming machine terminals and the output dependent on the game result is generated and presented on each of the coupled gaming machine terminals. If a pure queue order is applied it may thus happen that several player inputs that are entered in sequence closely in time results in a series of output result presentations that proceed un-paused until the queue is emptied and the game goes into a mode waiting for the next player input. Another variety is devised such that only the first received request message resulting from a player input is accepted. A game result is generated and transmitted to the gaming machine terminals. After the resulting output has been presented on the coupled gaming machine terminals, a new player input request will be accepted. In a third variety, a priority order for accepting player input from the respective gaming machine terminals is devised and employed such that when a plurality of player input generated requests are received in the server within a predetermined time period, the request with the highest priority is accepted and the others are discarded.

The communication between the gaming machine terminal and the gaming server as well as steps that are performed for realising the invention are described in the following exemplifying embodiment based on the client-server configuration. Reference is made to FIG. 1-4. The numbered list below is merely for reference purpose and does not necessarily mean that the steps are performed in a sequence corresponding to the indicated numerical order.

1. A player initiates a player session 401 on the client gaming machine 2 by inputting a start command to the client game module 18 via an I/O-interface (22,24,28) which may be a traditional button or a button field on a touch screen. The initiation of a player session would preferably also comprise a monetary transaction for bets in the game, for example by the player adding a coin to a cash box 24 or by means of an account transaction.
2. The client reconnect handler 30 comprised in the client gaming machine 2 transmits a request for the reservation of a reconnect identity code together with a client identification code for identification of the specific gaming machine to the server. This request is received by the server reconnect handler 32 similarly comprised in the gaming server 4.
3. The request is executed by the server reconnect handler 32 whereby a reconnect identity code is generated and stored associated with the client identification code in a database 10.
4. A player session identity code is generated and associated with the reconnect identity code in the database 10, and a player session 402 is established.
5. The reconnect identity code is transmitted to the client reconnect handler 30 and is stored in local data storage 29 in the client gaming machine 2 for the purpose of enabling communication of the reconnect identity code to the player.
6. A selected game is started by the player inputting a game start command to the game client module 18 via the game application program interface 20 of the client gaming machine 2, and a request to start a game session is transmitted to the gaming server 4.
7. A game session identity code is generated and stored associated with the player session identity code, a game session 402 is established, a first terminal session for the current gaming machine terminal 2 is established and coupled to the game session. A game phase 406 of a game round 404 is entered.
8. The player triggers a game round event by giving a game related input to the client game module 18 whereupon a request for a service is transmitted to the server game module 8.
9. The request is executed by the server game module 8 with the aid of the service functions of the server. The execution of this request would typically comprise the generation of a random number RNG and the determination of an outcome dependent on the RNG.
10. Execution steps that are performed by the server game module 8 for each request as well as results and outcomes of the execution make up game session data, i.e. information that applies to the currently ongoing game session. A subset of the game session data is the result of a game round event and applies to the current game phase. A selection of these game session data are compiled and cashed, i.e. temporarily stored in data storage of the server 8. The selection may vary in different execution cases and embodiments, and would preferably comprise: the bet value, the random number and the win value that are valid for the current game phase. The selection of game session data may also comprise optional pieces of information regarding the sequence of events called event history, each request and response, a pot at stake, the request, the response to the client gaming machine, game configuration information and a status indicator devised to indicate whether the game session has been completed or interrupted e.g. indicating last event=true/false.
11. The selection of game session data is stored in the database 10 and is transmitted with a response to the client gaming machine 2. The received selection of game session data is cashed, i.e. temporarily stored in data storage of the client gaming machine 2.

12. The outcome of the game round event is presented to the player for example via image output on a presentation screen of the client gaming machine 2.

13. A request may be made for a second gaming machine terminal to be coupled to the current game session, whereupon a second terminal session for the second gaming machine is established and coupled to the current game session. The game session and the terminal sessions are managed as described above.

14. The steps 8-12 are normally repeated until a game round is ended, for example controlled by the player or by the gaming server according to predetermined rules.

15. If an interruption occurs, i.e. the client looses contact with the server, the reserved reconnect identity code that is temporarily stored in the storage 29 of the client gaming machine 2 is for example printed out on a piece of paper or other suitable carrier to make up a reconnect voucher output to the player. The reconnect voucher is in a currently preferred embodiment printed with a bar code comprising the reconnect identity code and a status indicator for the interrupted game, and some text information for example about the gaming venue.

The game session may be interrupted when the last of a plurality of gaming machine terminals and the last terminal session are terminated. For the purpose of reconnecting the game and resume the game session the interrupted game is found by means of the reconnect identity code as a key input to the gaming system. The reconnect procedure is here explained by way of example with the reconnect voucher embodiment in which the player enters a reconnect voucher in a bar code reader of a client gaming machine of the gaming system. It should be understood that also other means of conveying the reconnect identity code to the gaming system are within the inventive concept. The reconnect voucher can for example be inserted in the same gaming machine in which the game was interrupted, a different gaming machine or in an administrative client terminal. The administrative client terminal is preferably devised only to be able to refind money or issue a monetary credit. The procedure for reconnection comprises in one embodiment a selection of the following steps.

1. If the client gaming machine in which the game was interrupted logins with the gaming server and a new player session is initiated, the client handler 36 of the gaming server detects in a check procedure that this particular client gaming machine has had an interrupted game. The client identification code is associated with the previous reconnect voucher for that specific client and the stored game session data, and a new reconnect identification code is reserved and transmitted to the client gaming machine to replace the previous and activated reconnect identity code.

2. If a player starts a player session in a different client gaming machine, a new reconnect identification code is reserved in the normal manner.

3. The player inputs a reconnect voucher into the bar code reader of the client gaming machine, and the information on the reconnect voucher is read and treated under the control of the client control module 34 and the client reconnect handler 30. The information on the reconnect voucher is transmitted with a request to the gaming server.

4. The gaming server checks the status of the reconnect voucher and determines by means of the status indicator and information stored in the server database whether there is an interrupted game session.

5. If there is a monetary credit only, the money is credited to the player for a new game or as a refund.

6. If there is un-synchronized money, a synchronization procedure is executed.

7. If there is an interrupted game, the game is reconstructed and presented to the player in the state in which it was interrupted.

The reconstruction of an interrupted game can be implemented in various manners. One embodiment comprises of the following steps.

1. With the reconnect identity code as a key, the associated game session data is retrieved from the server database under the control of the server reconnect handler 30.

2. The server reconnect handler 30 uses the retrieved game session data as input to the server game module 8 and generates the last response from the server game module that should have been transmitted to the client gaming machine unless the interruption had occurred. In different embodiments 3. Reconnect information comprising game session data is compiled and transmitted to the client reconnect handler 30 of the client gaming machine. In one embodiment this reconnect information comprises the game identifications for the server game module and the client game module, game session data including an initial monetary-balance, all requests and all responses of the event history.

4. In the client gaming machine, the client game module is initiated and the game is executed by the client reconnect handler 30 using the game session data as input up to the last completed game phase before the point of interruption, called the reconnect target point. In contrast with the normal execution of a game, the requests that are generated in the reconnect execution are discarded and after each request the game is presented with the corresponding response from the game session data. Since the client reconnect handler 30 has access to all the requests as well as the responses to the requests it is enabled that a check of a proper reconstruction of the game session can be performed. Preferably, the game is executed up to the reconnect target point without presenting the intermediate results to the player in order to speed up the execution and avoid confusing the player.

5. After the last event and thereby the last completed game phase has been executed, the corresponding result and state of the game is presented to the player via the graphical user interface and the game enters a waiting mode waiting for the next input from the player.

6. The game continues in a normal manner.

The invention inter alia has the effect that a game session can be operated via a plurality of gaming machine terminals. Another effect of the invention is that the operation of a game session can be moved from one gaming machine terminal to another and thereby roaming the operation of an on-going game without any interruption.

The invention has been described by way of exemplifying embodiments, but naturally there a various manners of realising the invention within the scope of the claims.

The invention claimed is:

1. A method for managing a game session in a computerized gaming system adapted for operating a plurality of client gaming machine terminals communicatively coupled to a gaming server, each of said client gaming machine terminals having a human interface device, comprising the steps of:
 initiating the game session at a first gaming machine terminal by communicating a game initiation request from the first gaming machine terminal to said gaming server;
 storing game session identity information for the game session at said gaming server;
 coupling said gaming session and a first terminal session corresponding to the first gaming machine terminal, said coupling establishing transmission of player requests corresponding to input signals received from the human interface device of the first gaming machine terminal;

communicating further game session identity information from said gaming server to said first gaming machine terminal for provision on a physically transportable carrier medium, wherein the physically transportable carrier medium is provided from an output device at said first gaming machine terminal;

entering the further game session identity information from the physically transportable carrier medium using the human interface device at a second gaming machine terminal to initiate coupling of said second gaming machine terminal to said game session;

communicating the further game identity information from the second gaming machine terminal to said gaming server, wherein said further game identity information includes information to identify said second gaming machine terminal that is to be coupled to said game session;

establishing coupling between said game session and a second terminal session corresponding to the second gaming machine terminal, wherein said coupling between said game session and said second terminal session establishes transmission of player requests corresponding to input signals received from the human interface device of the second gaming machine terminal; and establishing a priority order for processing the transmission of the player requests such that when a plurality of transmitted player requests are received by the gaming server within a predetermined time period, the player request with a highest priority is processed by the gaming server and other player requests are discarded.

2. The method of claim 1, further comprising the step of:
checking the capability of said second gaming machine terminal to execute the game of said game session.

3. The method of claim 1, further comprising the step of:
configuring said second gaming machine terminal dependent on game session execution information.

4. The method of claim 1, further comprising the step of:
establishing a terminal session coupled to said game session for each gaming machine terminal to be coupled to said game session.

5. The method of claim 1, wherein:
said second gaming machine terminal is identified by selecting a selectable predetermined gaming machine terminal.

6. The method of claim 1, wherein:
said second gaming machine terminal is identified by selecting a predefined gaming machine terminal associated with a specific player identity.

7. The method of claim 1, wherein:
said second gaming machine terminal is identified by a specific telephone number.

8. The method of claim 1, wherein:
said second gaming machine terminal is identified by a specific address and is connectable to the gaming server a communications network.

9. The method of claim 1, wherein:
a predetermined time delay in establishing coupling of the second gaming machine terminal is enabled.

10. The method of claim 1, wherein:
a second terminal session for the game session is established and set in a waiting mode until an indication that said second gaming machine terminal is couplable to the game session is detected.

11. The method of claim 1, wherein:
said second gaming machine terminal is couplable in response to an indication that a specified player card or player identity has been logged onto the gaming server after being entered into said second gaming machine terminal through the further human interface device.

12. The method of claim 1, wherein:
when an addressable gaming machine terminal is specified as the second gaming machine terminal, a terminal session manager repeatedly tries to establish communication with the second gaming machine terminal.

13. The method of claim 1, wherein:
a plurality of terminal sessions are couplable to one and the same game session, and wherein each terminal session is couplable to a single game session only.

14. The method of claim 1, wherein:
a game session is couplable to a single or to a plurality of gaming machine terminals.

15. The method of claim 1, wherein:
a gaming machine terminal is couplable to one or a plurality of game sessions.

16. The method of claim 1, wherein:
a terminal session for a gaming machine terminal is associated with terminal session identity information.

17. The method of claim 1, wherein:
a terminal session and a game session are enabled to exist without any gaming machine terminal coupled to it dependent on a predetermined control parameter.

18. The method of claim 1, wherein:
input and output of player request transmissions from respective coupled gaming machine terminals is controlled according to predetermined rules.

19. The method of claim 1, wherein:
input of player request transmissions is enabled only via one of a plurality of gaming machine terminals coupled to said game session.

20. The method of claim 1, wherein:
input of player request transmissions and result output transmissions are enabled for all gaming machine terminals coupled to said game session.

21. The method of claim 1, wherein:
the player request transmissions from different gaming machine terminals coupled to the same game session are buffered in a queue, wherein said player request transmissions, once accepted in said priority order, are treated in the order that the player request transmissions are received by the gaming server.

22. The method of claim 1, wherein:
a first player request transmission resulting from a player input is accepted and treated, and a subsequent player request transmission is only accepted and treated after the output resulting from said first player request transmission has been presented at the coupled gaming machine terminals.

23. A method for managing a game session in a computerized gaming system adapted for operating a plurality of client gaming machine terminals communicatively coupled to a gaming server, comprising the steps of:

initiating the game session at a first gaming machine terminal of by communicating a game initiation request from the first gaming machine terminal to said gaming server;

storing game session identity information for the game session at said gaming server to establish coupling between said gaming session and a first terminal session corresponding to the first gaming machine terminal, wherein said coupling establishes transmission of player requests corresponding to input signals received from a human interface device of the first gaming machine terminal;

communicating a game initiation request from a second gaming machine terminal to said gaming server to initiate coupling of said second gaming machine terminal to said game session through a second terminal session corresponding to the second gaming machine terminal, wherein establishing coupling between said game session and the second terminal session establishes transmission of player requests corresponding to input signals received from a human interface device of the second gaming machine terminal; and establishing a priority order for processing the transmission of the player requests, wherein, when a plurality of transmitted player requests are received by the gaming server within a predetermined time period, the player request transmission with a highest priority is processed and other player request transmissions occurring within the predetermined time period are discarded.

24. The method of claim 23, further comprising enabling a predetermined time delay in establishing coupling of the second gaming machine terminal.

25. The method of claim 23, wherein the player request transmissions from different gaming machine terminals coupled to the same game session are buffered in a queue, wherein said player request transmissions, once accepted in said priority order, are treated in the order that the player request transmissions are received by the gaming server.

26. The method of claim 23, wherein a first received player request transmission resulting from a player input is accepted and processed, and a subsequently received player request transmission is only accepted and processed after the output resulting from said first received player request transmission has been presented at the coupled gaming machine terminals.

* * * * *

UNITED STATES PATENT AND TRADEMARK OFFICE
CERTIFICATE OF CORRECTION

| | | |
|---|---|---|
| PATENT NO. | : 8,516,124 B2 | Page 1 of 1 |
| APPLICATION NO. | : 12/177676 | |
| DATED | : August 20, 2013 | |
| INVENTOR(S) | : Hutchinson-Kay et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 752 days.

Signed and Sealed this
Seventeenth Day of February, 2015

Michelle K. Lee
*Deputy Director of the United States Patent and Trademark Office*